United States Patent

[11] 3,589,479

[72] Inventors C. Lucas Plaat;
 Arthur J. Thrower, both of Troy, Ohio
[21] Appl. No. 855,498
[22] Filed Sept. 5, 1969
[45] Patented June 29, 1971
[73] Assignee The B.F. Goodrich Company
 New York, N.Y.

[54] BRAKE RETRACTOR MECHANISM
 4 Claims, 4 Drawing Figs.
[52] U.S. Cl. .................................................. 188/196,
 188/71.8
[51] Int. Cl. ................................................. F16d 65/54,
 F16d 55/18
[50] Field of Search .......................................... 188/71.8,
 72.3, 196 P

[56] References Cited
 UNITED STATES PATENTS
 2,889,104 5/1959 Frayer ........................ 188/71.8
 2,951,560 9/1960 Smellie ........................ 188/71.8
 3,091,310 5/1963 Smith et al. ................... 188/196

Primary Examiner—Duane A. Reger
Attorneys—John D. Haney and Harold S. Meyer

ABSTRACT: A brake retractor assembly in which the automatic adjustment mechanism includes a locking plate assembly for gripping the retractor rod in a tilted position and a friction engaging member carried by the locking plate for relative rotational movement therewith so that the friction engaging face of this member conforms to the face of the retractor rod.

INVENTORS
C. LUCAS PLAAT
ARTHUR J. THROWER
BY John D. Haney
ATTY.

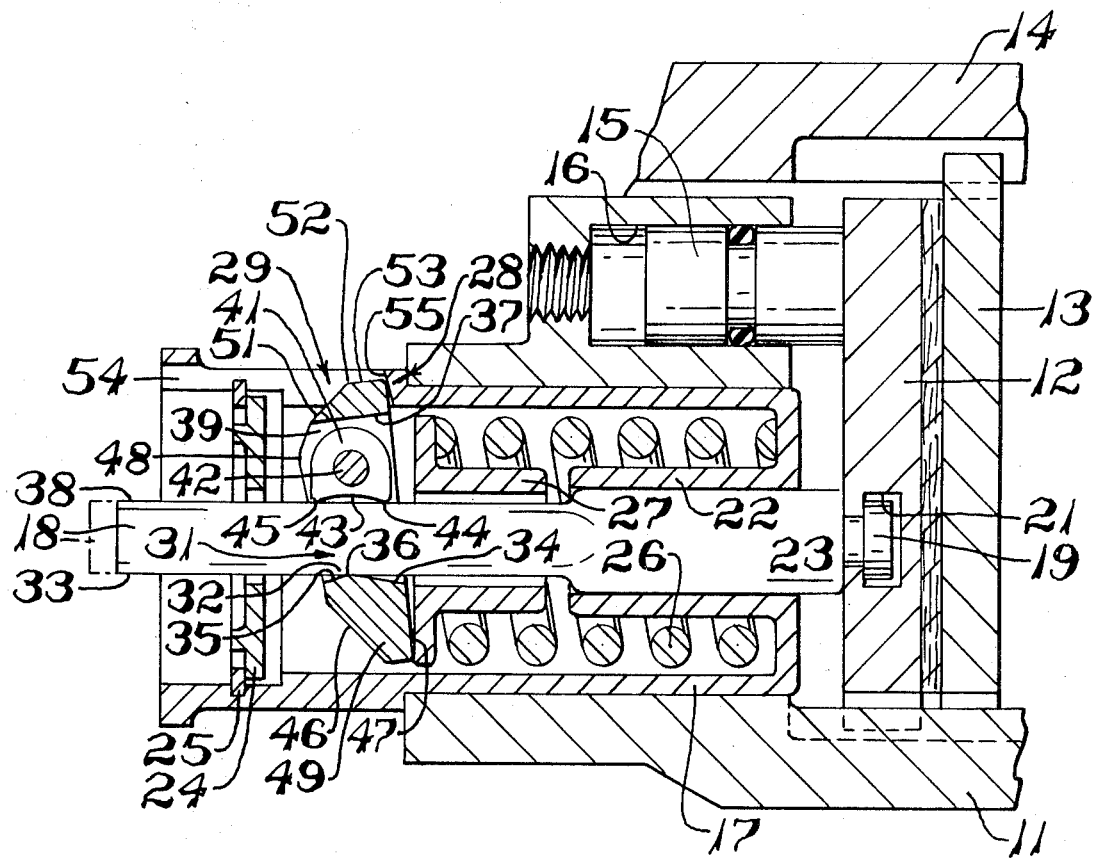

BRAKE RETRACTOR MECHANISM

BACKGROUND OF THE INVENTION

This invention relates to mechanism for automatically maintaining a uniform release clearance (and therefore a uniform actuating stroke) for brakes and similar equipment. Mechanisms of this type are commonly used in brake systems to compensate for wear of the brake linings and other brake parts and are popularly called "automatic brake adjusters." Although the present invention is explained here in connection with brakes, the mechanism has utility in other environments where similar wear compensation is needed such as in clutches.

For many years, brake adjusters or wear compensators have been of two basic designs. The mechanical adjusters utilized special ratchets or friction-dragging parts to control the adjustment and the hydraulic adjusters utilized the metering of hydraulic fluid to provide adjustment. A sophisticated form of hydraulic adjuster is described, for example, in U.S. Pat. No. 2,926,498 and a mechanical ratchet adjuster is described, for example, in U.S. Pat. No. 1,825,555. An improved form of mechanical adjuster in which the step-by-step adjustments of the ratchet-type adjuster are avoided and the adjustments can be made in small increments is shown and described in U.S. Pat. No. 2,392,970 and U.S. Pat. No. 3,091,310 in which gripping of the retractor rod is provided through the use of collets or locking plates.

In the design of new aircraft the capacity of the brakes has been increased; however, the space for the brake elements has not been increased. Accordingly, the need is for a brake retractor mechanism which will provide more clamping force in the same package. It is also essential that the clamping force be substantially constant so that a controllable adjustment for brake wear is obtained to provide a constant release clearance.

Another requirement for brake retractors is that the clamping force remain high and the operation remain predictable even after substantial wear takes place. Still another requirement is that an improved locking plate assembly be adaptable for use in retractors which have the same design as that used for older type locking plates. The above requirements must be provided in an assembly which is relatively service-free and is substantially free of assembly and installation problems

SUMMARY OF THE INVENTION

The locking plate assembly of this invention includes a clamping member which may be substituted for locking plates of the type found in other brake retractors but which provides substantially more clamping force on the retractor rod. The use of a tilt-compensating cam carried by the clamping member increases the clamping force which is exerted against a substantially flat surface on the retractor rod.

The clamping member has an opening through which the retractor rod is disposed and in the preferred construction the retractor rod has a square cross section so that the surfaces which are engaged by the clamping member are substantially flat. Interposed between one edge of the opening and the face of the retractor rod is a cam or tilt-compensating member which is connected to the clamping member by a pivot pin. The cam pivots around an axis which is substantially perpendicular to the plane in which the clamping member tilts. As the clamping member tilts in one direction the cam is urged into frictional engagement with the flat surface of the retractor rod because the distance between the pivot pin and the edge of the opening in the clamping member is foreshortened. The face of the cam which engages the retractor rod has contact points which are spaced apart in the longitudinal direction of the retractor rod so that the engaging faces of the cam and rod will conform. In this manner the cam compensates for the tilt of the clamping member and even though there is wear of the pivot pin and clamping member, the clamping force remains substantially constant. The clamping force is also distributed over a wider area of the retractor rod than is possible with the type locking clamp used heretofore.

When the clamping member is tilted in the other direction the distance between the axis of the pivot pin and the edge of the opening in the clamping member is increased permitting slippage of the retractor rod through the clamping member. This relative movement of the clamping member and rod is necessary to compensate for the wear between the brake discs. After this compensating movement has taken place the retractor spring will operate against the end of the clamping member to provide tilting action which will again result in substantial clamping force being exerted against the retractor rod for locking the clamping member and the retractor rod together.

The accompanying drawings show one preferred form of brake retractor made in accordance with an embodying this invention and which is representative of how this invention may be practiced.

BRIEF DESCRIPTION OF THE DRAWING

In the drawings:

FIG. 2 is a view corresponding to FIG. 1 except that the brake is engaged and the retractor assembly is in the condition its parts occupy during an adjusting movement of the locking plate assembly to compensate for wear of the brake friction faces;

FIG. 4 is a view in section taken along the line 4-4 of FIG. 1.

DETAILED DESCRIPTION

Figure 1:
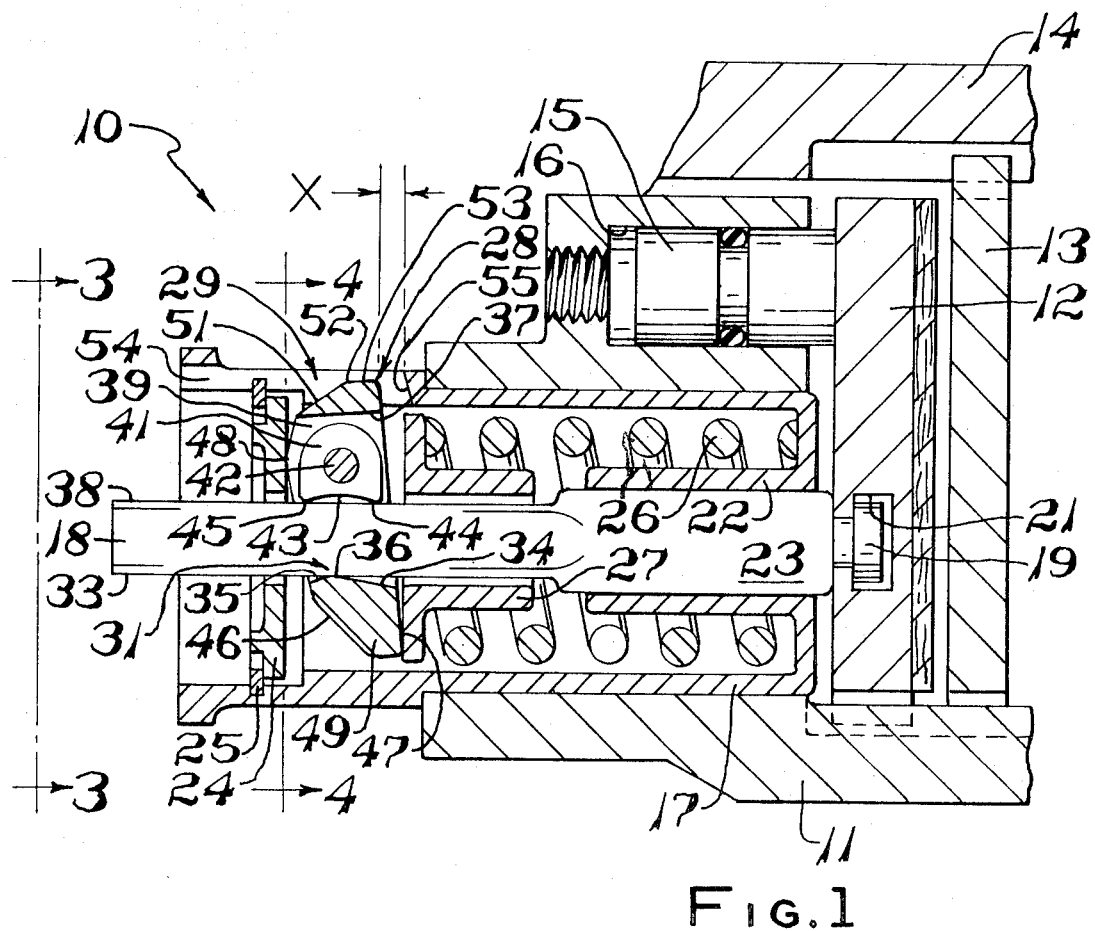
FIG. 1 is a longitudinal cross section of the retractor assembly installed in a typical disc brake, the assembly being in the condition its parts occupy when the brake is retracted or released, the brake parts being shown in generalized or somewhat schematic form with some parts being broken away.

A retractor assembly 10 is mounted rigidly in a torque frame 11 of a brake, the frame in turn being adapted for mounting to a vehicle structure (not shown). The frame 11 carries a lining carrier 12 in parallel axial alignment with a rotatable disc 13. The latter is in splined engagement at its periphery with a rotary member 14 which may be part of the wheel structure with which the brake is associated. On the other side of the rotatable disc 13, in the area which is broken away, another lining carrier and retractor assembly like that shown may be mounted on the torque frame 11.

The brake is actuated and the brake members engaged by a hydraulic piston 15 mounted in a cylinder 16 in the brake frame 11. In response to hydraulic pressure the hydraulic piston 15 urges the lining carrier 12 against the brake disc 13 which resists axial movement by engaging other brake members (not shown). The brake members as shown in FIG. 1 are in the released condition with the lining carrier 12 and the rotatable disc 13 out of engagement. In FIG. 2 the retractor assembly is shown in the actuated condition with the brake members in engagement.

The brake retractor assembly 10 includes a cylindrical housing 17 which may be part of the brake frame 11 or adapted for tight anchorage inside the brake frame as shown in FIG. 1.

A retractor rod 18 extends through the housing 17 and towards the braking members where it is connected to the lining carrier 12 as by insertion of an enlarged head 19 of the retractor rod in a slot 21 of the lining carrier as shown in FIG. 1 or by other arrangements well known in the art.

Figure 3:
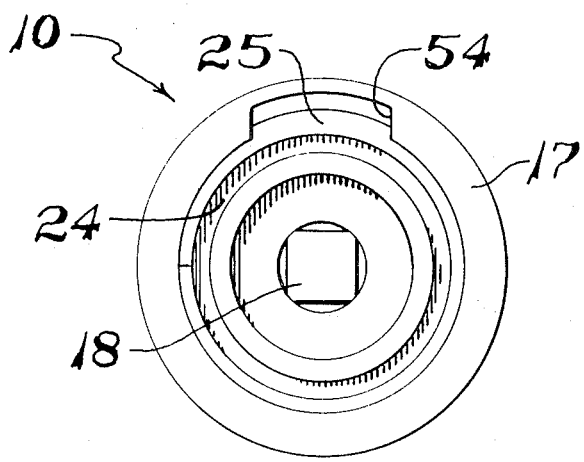
FIG. 3 is a view on the line 3-3 of FIG. 1.

The cylindrical housing 17 has an annular flange 22 at the end adjacent the braking members which supports the retractor rod 18 for reciprocation therein. A cylindrical potion 23 of the retractor rod 18 is in slidable engagement with the annular flange 22. The portion of the retractor rod 18 at the opposite end is supported concentrically of the housing 17 by an annular cover plate 24 fastened securely in the outer open end of the housing by a snap ring 25. At this end of the retractor rod 18 the portion projecting through the cover plate 24 has a substantially square cross section as shown in FIGS. 3 and 4 and therefore the center hole in the plate 24 is also of a square configuration with a sliding clearance between the edges of the hole and the rod to permit free reciprocation.

A helical-coiled retractor spring 26 is housed inside the housing 17 concentrically surrounding the rod 18 and annular flange 22. The retractor spring 26 is caged under compression in the housing 17 with the right end coil of the spring (as viewed in FIG, 1) bearing against the inner end wall of the housing 17 and the left end coil bearing against a flanged collar 27 which is slidable loosely on the portion of the retractor rod 18 having the square cross section. The helical spring 26 biases the collar 27 leftward into engagement with a locking plate assembly 28 which has a clamping member 29 surrounding the rod 18 in the region between the flanged collar 27 and the end cover plate 24.

The clamping member 29 is a generally annular disc and includes a central opening 31 through which the rod 18 projects. Lower edge 32 of the opening 31 is disposed in close sliding proximity to a lower flat face 33 at the underside of the retractor rod 18 and preferably has two flat faces 34 and 35 which come together at a pivoting edge 36.

The opening 31 has an upper edge 37 which is spaced from the upper face 38 of the rod 18 providing a slot 39 in which a frictional-engaging tilt-compensating member such as cam 41 is mounted for turning movement about a pivot pin 42 connected to the clamping member 29. The pivot pin 42 has an axis which is preferably perpendicular to a vertical plane passing longitudinally through the center of the housing 17 and retractor assembly 10.

As shown in FIGS. 1 and 4 the cam 41 has a rod-engaging face 43 with contact edges 44 and 45 which are apaced apart for contacting the rod at longitudinally spaced-apart positions. These contact edges are preferably straight for engaging the flat upper face 38 of the rod 18.

Opposing radial faces 46 and 47 of the clamping member 29 taper towards each other from a thick region 48 to a thinner region 49 at the lower edge of the clamping member. The biasing force of spring 26 urges collar 27 against the thin region 49 of the clamping member 29, thereby tilting or canting this member so that the pivoting edge 36 at the lower edge of the opening and the contact edges 44 and 45 on the face of the cam 41 engage the rod 18 and provide sufficient clamping force to prevent slippage of the retractor rod through the locking plate assembly 28.

In the released condition of the brake as shown in FIG. 1, the flanged collar 27 under the bias of spring 26 presses the thick region 48 of the clamping member tightly against the end cover plate 24 to provide a positive retracted position for the rod 18. The flanged collar 27 actually bears against the clamping member 29 only at the projecting edge of the thinner region 49. Along the opposite face of the thick region 48 clamping member 29 is beveled at 51 so that the opposite side of the clamping member engages cover plate 24 at an edge of bevel 51 which is radially offset inwardly from the periphery of clamping member 29. This arrangement insures that the clamping member 29 remains tilted and in engagement with the rod 18 when the rod is in a retracted position as in FIG. 1 and it may be noted that in this retracted position the opposing faces 46 and 47 of the clamping member slant away from their respective adjoining surfaces on cover plate 24 and collar 27.

The upper peripheral edge 52 of the clamping member 29 includes a lobe or projection 53 which extends into a slot 54 in the housing wall. This slot 54 terminates in a shoulder 55 which is of greater diameter than the flanged collar 27 so that the collar cam slide past the shoulder when the rod 18 is reciprocated. The shoulder 55 is adapted to engage the projection 53 of the clamping member 29, however, whenever the rod is advanced rightward for a distance sufficient to bring the projection 53 against this shoulder.

When the brake is operated by communicating hydraulic fluid to piston 15 the latter displaces lining carrier 12 rightward pulling rod 18 axially through the flange 22 of housing 17. Clamping member 29 moves rightward as the rod 18 advances because the biasing force of spring 26 against flanged collar 27 maintains the clamping member tilted in tight frictional engagement with the rod 18. Tilting of the clamping member 29 causes a clamping force to be exerted between the pivoting edge 36 of the opening 31 and the rod engaging face 43 of the cam 41. Regardless of the tilting of the clamping member or the wear of the parts the cam 41 transmits the torque from the pivot pin 42 to the contact edges 44 and 45 where the clamping force is evenly distributed and the turning action of the cam 41, therefore, compensates for the tilting of the clamping member 29.

Should there be no appreciable wear or other conditions materially changing the release clearance between the lining carrier 12, rotatable disc 13 and other braking members while these members are engaged, then rod 18 will not be axially displaced an amount sufficient to bring projection 53 of the clamping member 29 against the shoulder 55. Instead the locking plate assembly 28 will remain engaged with the rod 18 and when the brake actuation pressure is released the retractor spring 26 will expand to displace the rod to its original starting position.

The retractor assembly 10 is designed so that the distance designated by dimension "X" in FIG. 1 between the annular shoulder 55 and the released position of the projection 53 is equal to the maximum allowable release clearance between the lining carrier 12 and the adjoining braking members. So long as the release clearance does not exceed an amount indicated by dimension "X" the locking plate assembly 28 will always remain in tight frictional engagement with rod 18 and the brake members may be engaged and released repeatedly.

Owing to the erosion of the brake lining as the brake is used, the release clearance between the retracted position of the lining carrier 12 and the adjoining brake members tends to increase progressively. The existence of this condition is automatically sensed in this mechanism because rod 18 and lining carrier 12 can be displaced for whatever distance necessary to bring about brake engagement regardless of wear. Accordingly, whenever the lining carrier 12 and rod 18 are moved through a distance greater than that equal to dimension "X" in order to engage the rotatable disc 13 and other braking members, the projection 53 of the clamping member 29 will be forced into engagement with shoulder 55. The latter then urges the clamping member 29 into its position shown in FIG. 2 in which the frictional engagement of the cam 41 with rod 18 is released. Rod 18 can then be slid forward freely through the opening 31 in the clamping member 29 for whatever distance is required to maintain brake engagement. On the subsequent release of fluid pressure against the piston 15 the retraction forces on the brake members will act to move rod 18 in the reverse direction and the biasing force of the retractor spring 26 against collar 27 is immediately effective to tilt the clamping member 29 into its frictionally engaged position urging cam 41 and the rod engaging face 43 into frictional engagement with rod 18. Accordingly, the retractor spring 26 will then through the agency of the reengaged clamping member 29 retract the lining carrier 12 from the other brake members. Since the retraction stroke is limited by the distance clamping member 29 can move before it abuts cover plate 24, the rod 18 is retracted only a distance equivalent to dimension "X" and therefore a new starting position is established for the rod and the lining carrier 12 in which the release clearance between the lining carrier, rotatable disc 13 and the other brake members is again equal to dimension "X".

The progressive relocation of the starting position of the rod 18 and the lining carrier 12 in this manner does not change the maximum deflection amplitude of the retractor spring 26. The retractor spring deflection amplitude remains substantially the same on every actuation from the time the brake is new until the lining is entirely worn out.

In high energy brakes where the hydraulic pressure used to actuate piston 15 and cylinder 16 is necessarily high, There may be back pressure in the cylinder tending to urge the rod 18 rightward in FIG. 1 when the brake is released. It is, therefore, desirable that the clamping force be adequate to prevent slippage of the locking plate assembly 28 along the rod 18. In this invention the clamping force exerted by the rod engaging face 43 of cam 41 against the rod 18 insures that the rod will remain in any adjusted position. Also, if there is wear of the pivot pin 42, rod engaging face 43, pivoting edge 36 or lower face 33 and upper face 38 of the rod, this will be compensated for by the rotation of cam 41 on the pivot pin 42 and the same substantial clamping force will be exerted against the rod 18.

To reline the brake, the position of the rod 18 may be reset by pushing the lining carrier 12 toward the housing 17. When such force is applied axially of rod 18, the clamping member 29 turns against the spring 26 to a position in which the locking plate assembly 28 is released from frictional engagement with the rod 18 and the rod can be slid leftward to its original position.

Depending on the size of the brake, one or a number of these retractor assemblies may be used in arcuately spaced positions in the torque frame.

We claim:

1. A locking plate assembly for a brake retractor mechanism comprising a rigid clamping member having an opening through which a retractor rod is disposed, means to tilt said clamping member relative to said rod to bring a pair of opposing edges of said opening into clamping engagement with the face of said rod, at least one of said pair of opposing edges having a tilt-compensating member mounted thereon for turning movement relative to said clamping member, said compensating member having a surface for frictional clamping engagement with said rod and said surface contacting said rod at spaced-apart positions to provide a turning movement of said compensating member until there is conformance of said surface with the face of said rod as said pair of opposing edges are urged together upon tilting of said clamping member.

2. A locking plate assembly according to claim 1 wherein said compensating member is mounted for relative turning movement about an axis perpendicular to the plane in which said clamping member tilts.

3. A locking plate assembly according to claim 2 wherein said compensating member is connected to said clamping member by a pivot pin disposed along said axis.

4. A locking plate assembly according to claim 1 wherein said surface for frictional clamping engagement with said rod has straight edges which engage a flat face of said rod to provide maximum clamping forces.

UNITED STATES PATENT OFFICE
CERTIFICATE OF CORRECTION

Patent No. 3,589,479　　　　　　　Dated June 29, 1971

Inventor(s) C. Lucas Plaat and Arthur J. Thrower

It is certified that error appears in the above-identified patent and that said Letters Patent are hereby corrected as shown below:

Column 3, line 36 "apaced" should read ---spaced---.

Column 3, line 71, "cam" should read ---can---.

Column 5, line 2, "There" should read ---there---.

In the references cited, "2,889,104" should read ---2,888,104---.

Signed and sealed this 25th day of January 1972.

(SEAL)
Attest:

EDWARD M. FLETCHER, JR.
Attesting Officer

ROBERT GOTTSCHALK
Commissioner of Patents